United States Patent
Hinokio et al.

(10) Patent No.: US 9,275,615 B2
(45) Date of Patent: Mar. 1, 2016

(54) INFORMATION PROCESSING TERMINAL THAT DISPLAYS INFORMATION RELATED TO A FUNCTION SELECTED BASED ON A POSITIONAL RELATION, AND SYSTEM

(75) Inventors: Akie Hinokio, Hamamatsu (JP); Yoshihiro Katsumata, Hamamatsu (JP)

(73) Assignee: YAMAHA CORPORATION, Hamamatsu-shi (JP)

( * ) Notice: Subject to any disclaimer, the term of this patent is extended or adjusted under 35 U.S.C. 154(b) by 221 days.

(21) Appl. No.: 13/271,822

(22) Filed: Oct. 12, 2011

(65) Prior Publication Data

US 2012/0090447 A1 Apr. 19, 2012

(30) Foreign Application Priority Data

Oct. 15, 2010 (JP) .................................. 2010-232658

(51) Int. Cl.
| | |
|---|---|
| G10H 1/06 | (2006.01) |
| G10H 1/00 | (2006.01) |
| G06F 1/16 | (2006.01) |
| G06F 3/0484 | (2013.01) |
| G06F 3/0485 | (2013.01) |
| G06F 3/0488 | (2013.01) |
| G10H 1/24 | (2006.01) |
| G10H 1/32 | (2006.01) |

(52) U.S. Cl.
CPC ............ *G10H 1/0008* (2013.01); *G06F 1/1626* (2013.01); *G06F 1/1694* (2013.01); *G06F 3/0485* (2013.01); *G06F 3/0488* (2013.01); *G06F 3/04847* (2013.01); *G10H 1/24* (2013.01); *G10H 1/32* (2013.01); *G06F 2200/1637* (2013.01); *G10H 2220/096* (2013.01); *G10H 2220/106* (2013.01); *G10H 2220/201* (2013.01); *G10H 2230/015* (2013.01)

(58) Field of Classification Search
USPC .......................................................... 84/601
See application file for complete search history.

(56) References Cited

U.S. PATENT DOCUMENTS

| | | | | | |
|---|---|---|---|---|---|
| 6,005,545 | A | * | 12/1999 | Nishida ................. | A63F 13/005 345/173 |
| 6,104,387 | A | * | 8/2000 | Chery ................. | G06F 3/03545 178/18.04 |

(Continued)

FOREIGN PATENT DOCUMENTS

| | | |
|---|---|---|
| JP | 2007256503 A | 10/2007 |
| JP | 2007256504 A | 10/2007 |

(Continued)

OTHER PUBLICATIONS

European Search Report issued in corresponding EP patent application No. EP11185197.8, dated Feb. 21, 2012.

*Primary Examiner* — Christopher Uhlir

(74) *Attorney, Agent, or Firm* — Rossi, Kimms & McDowell LLP

(57) ABSTRACT

A sound generating system in the embodiment of the invention includes an information processing terminal displaying a screen relating to a setting for controlling an electronic musical instrument determined based on a positional relation with the electronic musical instrument on a display screen and transmitting control information based on an operation performed on a touch sensor, and the electronic musical instrument performing the setting relating to sound generation according to the received control information to generate an audio signal based on the performed setting.

9 Claims, 8 Drawing Sheets

(56) References Cited

U.S. PATENT DOCUMENTS

| | | | |
|---|---|---|---|
| 6,919,503 B2 * | 7/2005 | Nishitani | G10H 1/0058 84/633 |
| 2005/0212756 A1 | 9/2005 | Marvit et al. | |
| 2007/0186759 A1 | 8/2007 | Bang et al. | |
| 2007/0225831 A1 | 9/2007 | Sakurada | |
| 2007/0234883 A1 | 10/2007 | Koizumi | |
| 2009/0213032 A1 | 8/2009 | Newport et al. | |
| 2010/0042954 A1 * | 2/2010 | Rosenblatt | G06F 1/1626 715/863 |
| 2011/0005367 A1 | 1/2011 | Hwang et al. | |

FOREIGN PATENT DOCUMENTS

| | | |
|---|---|---|
| JP | 2007256754 A | 10/2007 |
| JP | 2007256755 A | 10/2007 |
| JP | 2009217027 A | 9/2009 |
| WO | 2009104933 A2 | 8/2009 |
| WO | 2009108029 A2 | 9/2009 |
| WO | 2010088477 A1 | 8/2010 |

* cited by examiner

FIG. 9

FUNCTION ASSIGNMENT INFORMATION

| FIRST HIERARCHY | | SECOND HIERARCHY | |
|---|---|---|---|
| DIVIDED AREA | CATEGORY | DIVIDED AREA | FUNCTION TO BE ACTIVATED |
| A | TONE SELECTION MODE | A | TONE SELECTION |
| | | B, C | WAVEFORM MODIFICATION |
| | | D, E | ENVELOPE MODIFICATION |
| | | F, G | AUDIO SETTING |
| B | MUSICAL COMPONENT SELECTION MODE | A | MUSICAL COMPONENT SELECTION |
| | | B, C | SCORE DISPLAY |
| | | D, E | LYRICS DISPLAY |
| | | F | METRONOME |
| | | G | RIGHT HAND LEFT HAND SELECTION |
| ⋮ | ⋮ | ⋮ | ⋮ |

FIG. 10

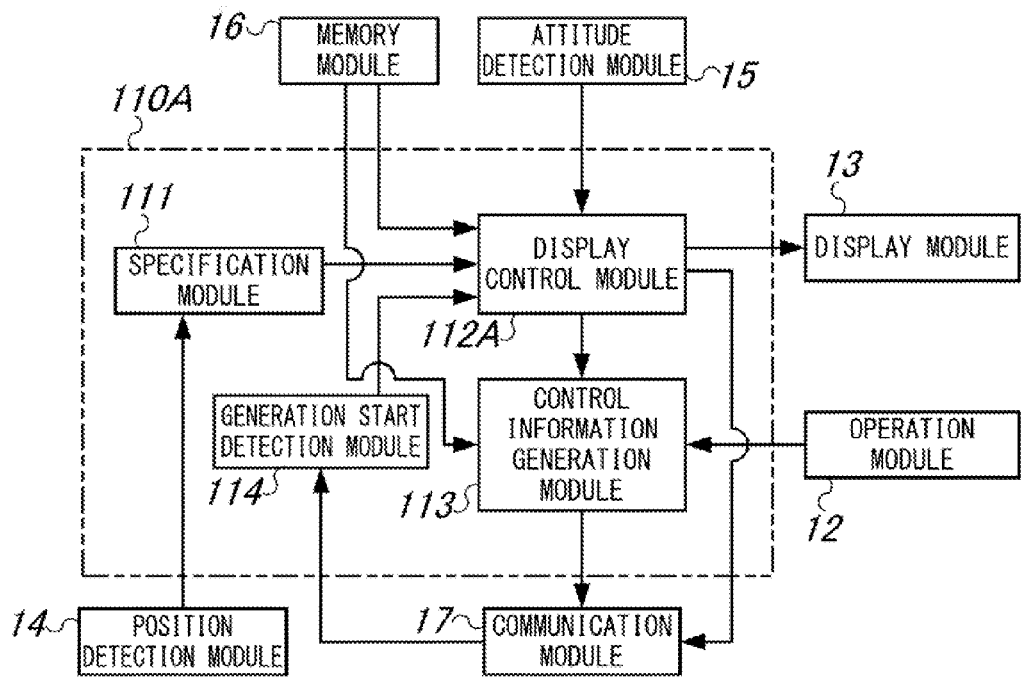

INFORMATION PROCESSING TERMINAL THAT DISPLAYS INFORMATION RELATED TO A FUNCTION SELECTED BASED ON A POSITIONAL RELATION, AND SYSTEM

BACKGROUND OF THE INVENTION

1. Field of the Invention

The invention relates to a technique of performing settings in an electronic device.

2. Description of the Related Art

An electronic musical instrument has many functions such as sound generation in various tones, automatic performance and so on. For these functions, various settings, for example, setting of a tone to be generated, setting of parameter of a tone, setting of automatic performance and so on are performed, and then processing in the electronic musical instrument is controlled according to the settings. The various settings are often performed using controls provided on a control panel of the electronic musical instrument. In this case, a larger number of controls are required with an increase in the number of available functions to make the control panel very complicated. Hence, a technique has been developed, in which a function assigned to one control can be arbitrarily changed so that an item to be set using the one control can be arbitrarily changed to another item (for example, Document 1).

Document 1: Japanese unexamined patent publication No. 2009-217027

SUMMARY OF THE INVENTION

In the technique disclosed in Document 1, a decrease in the number of controls provided in the electronic musical instrument enables a simple configuration of the control panel but requires frequent change of the functions assigned to the controls. On the other hand, an increase in the number of controls provided in the electronic musical instrument enables reduction in the number of times of changing the functions assigned to the controls but results in a complicated configuration of the control panel. Further, in order for the user to intuitively grasp functions assigned to the controls, the control panel needs to be provided with not only the controls but also a screen corresponding to the respective controls.

An object of the invention is to simplify configuration of a control panel for performing various settings while enabling intuitive settings, in an electronic device.

In order to achieve the above-described object, an embodiment of the information processing terminal of the invention is an information processing terminal which communicates with an electronic device, including: a specifying device for specifying positional relation between the electronic device and the information processing terminal; a display for displaying a screen; an operating device for accepting an operation; a display controller for controlling the display such that the display displays an information related to a setting for controlling the electronic device, the setting being selected based on the positional relation specified by the specifying device; a control information generator for generating control information for controlling the electronic device based on the operation accepted by the operating device and the information displayed on the display; and a control information transmitter for transmitting the control information generated by the control information generator to the electronic device.

In the above information processing terminal, it is conceivable that the information processing terminal further includes: an attitude detector for detecting attitude of the information processing terminal; and a communication device for communicating, when the attitude detected by the attitude detector satisfies a first condition, with an external device which stores an information regarding control of the electronic device, the display controller controls the display such that, when the communication device performs the communication, the display displays an information based on the communication performed by the communication device, and the control information generator generates the control information when the attitude detected by the attitude detector satisfies a second condition.

Further, it is also conceivable that the specifying device specifies the positional relation by detecting one of a plurality of positional information outputted by the electronic device.

Further, it is also conceivable that the setting to be selected based on the positional relation is defined by a plurality of positional relations in a plurality of levels of hierarchy.

An embodiment of the sound generating system of the invention is a sound generating system including the information processing terminal described above and the electronic device, wherein the electronic device includes: a control information receiver for receiving the control information transmitted from the information processing terminal; a setting device for performing a setting regarding sound generation based on the control information received by the control information receiver; an acquiring device for acquiring an instruction information indicating instruction of sound generation; and an audio signal generator for generating an audio signal based on the setting performed by the setting device and the instruction information acquired by the acquiring device.

In the above sound generating system, it is conceivable that the information processing terminal further includes a generation start detector for detecting start of generation of the audio signal by the audio signal generator, and the display controller controls the display such that the information displayed on the display is changed when the generation start detector detects the start of generation of the audio signal.

Further, it is also conceivable that the electronic device further includes a setting information transmitter for transmitting setting information indicating present status of the setting performed by the setting device to the information processing terminal, the information processing terminal further includes: a setting information receiver for receiving the setting information transmitted from the electronic device; and a setting information storing device for storing the setting information received by the setting information receiver, and the control information generator generates control information to instruct the setting device of the electronic device to perform the setting based on the setting information stored by the setting information storing device.

An embodiment of the system of the invention is a system including the information processing terminal described above and the electronic device, wherein the electronic device includes: a control information receiver for receiving the control information transmitted from the information processing terminal; a setting device for performing a setting based on the control information received by the control information receiver; an acquiring device for acquiring an instruction information indicating instruction of operation of the electronic device; and a processor for executing processing based on the setting performed by the setting device and the instruction information acquired by the acquiring device.

The above and other objects, features and advantages of the invention will be apparent from the following detailed description which is to be read in conjunction with the accompanying drawings.

BRIEF DESCRIPTION OF THE DRAWINGS

FIG. 9 is a chart illustrating function assignment information in a modification example 1 of the invention;

FIG. 10 is a functional block diagram illustrating a configuration of control information output function in a modification example 2 of the invention;

DETAILED DESCRIPTION OF THE PREFERRED EMBODIMENTS

Embodiment

1. Entire Configuration

Figure 1A:
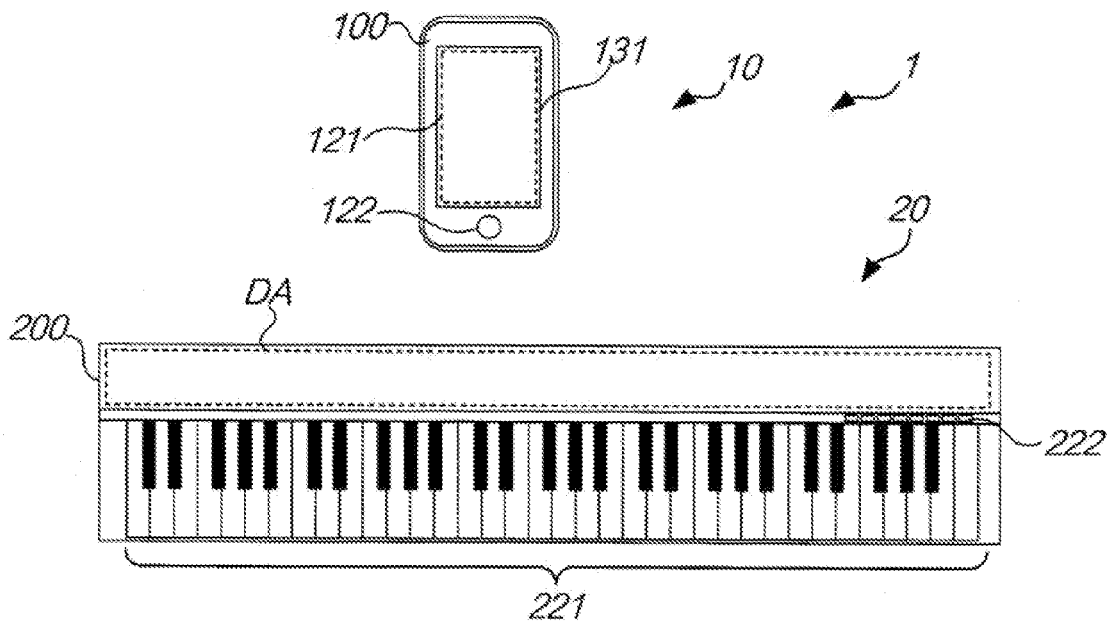
FIGS. 1A to 1C are views illustrating a configuration of a sound generating system in an embodiment of the invention.
Figure 1B:
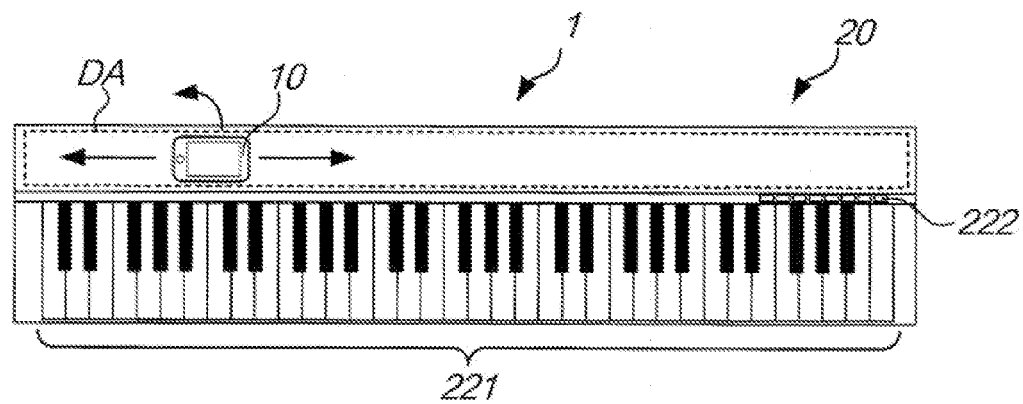
Figure 1C:
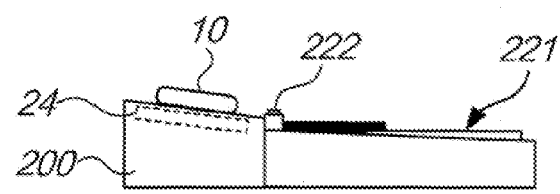

FIGS. 1A to 1C are views illustrating a configuration of a sound generating system 1 in an embodiment of the invention. The sound generating system 1 includes an information processing terminal 10 and an electronic musical instrument 20. The information processing terminal 10 is a portable information processing terminal such as a cellular phone or a PDA (Personal Digital Assistant). The electronic musical instrument 20 is a musical instrument such as an electric piano as an example of an electronic musical instrument of the invention, and has a sound generator which generates and outputs audio signals according to automatic performance or a performance operation on a keyboard 221.

As illustrated in FIG. 1A, the information processing terminal 10 has a touch sensor 121, an operation button 122, and a display screen 131 on a front surface of a casing 100. The touch sensor 121 is provided on a front surface of the display screen 131 and constitutes a touch panel together with the display screen 131. Though only one operation button 122 is illustrated in FIG. 1A, a plurality of or no operation button(s) 122 may be provided. The electronic musical instrument 20 has the keyboard 221 attached to a casing 200 and operation buttons 222. Note that electronic musical instrument 20 does not need to have the operation buttons 222.

At a part of the casing 200, a detection area DA is provided. The detection area DA is an area for enabling, when the information processing terminal 10 is placed thereon, the information processing terminal 10 to detect the position where it is placed. The detection area DA is the area where the control panel is provided in a standard electric piano. As illustrated in FIG. 1B, when the information processing terminal 10 is placed on the detection area DA of the electronic musical instrument 20, the information processing terminal 10 can perform various settings for controlling the electronic musical instrument 20 according to the position where it is placed. In this event, when the information processing terminal 10 is moved to another position or rotated to another orientation, items which can be set using the information processing terminal 10 is changed according to the position or orientation. The items which can be set using the information processing terminal 10 are presented to a user through display on the display screen 131. The user can change parameters in the various setting items corresponding to the display on the display screen 131 by operation on the touch sensor 121 or the like.

FIG. 1C is a view of the electronic musical instrument 20 as seen from the side (the left side in FIG. 1B) in the state where the information processing terminal 10 is placed in the detection area DA (FIG. 1B). As illustrated in FIG. 1C, a position output module 24 is provided inside the casing 200 in the detection area DA. Further, a surface of the detection area DA in the casing 200 is structured to be inclined with respect to the horizontal surface in this example, so that the electronic musical instrument 20 placed on the surface inclines with respect to the horizontal surface.

2. Configuration of Electronic Musical Instrument 20

Figure 2:
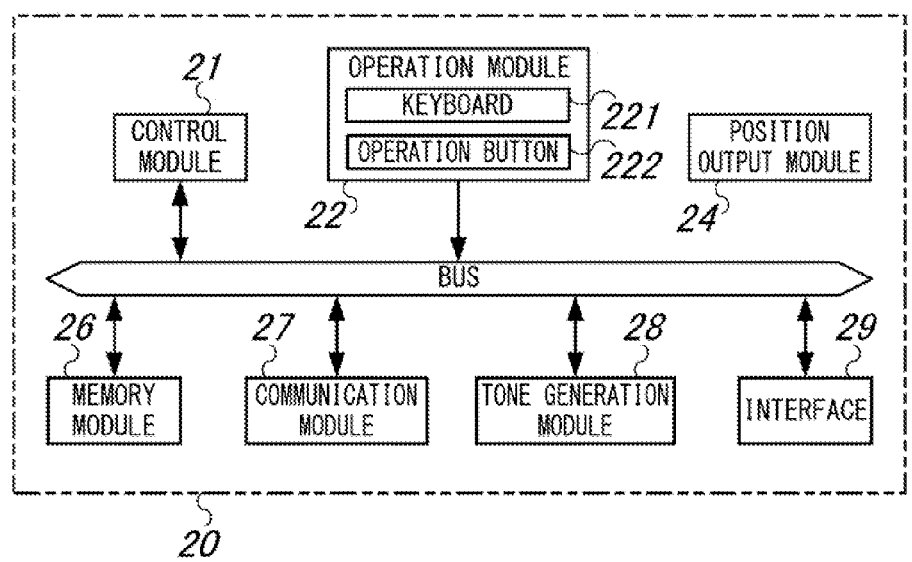
FIG. 2 is a block diagram illustrating a configuration of an electronic musical instrument in the embodiment of the invention.

FIG. 2 is a block diagram illustrating a configuration of the electronic musical instrument 20 in the embodiment of the invention. The electronic musical instrument 20 includes a control module 21, an operation module 22, a memory module 26, a communication module 27, a tone generation module 28, and an interface 29. These modules are connected to one another via a bus. The electronic musical instrument 20 further includes the position output module 24 provided near the detection area DA.

The control module 21 includes a CPU (Central Processing Unit), a RAM (Random Access Memory), a ROM (Read Only Memory) and so on. The control module 21 executes a control program stored in the ROM or the memory module 26 to thereby control the respective modules of the electronic musical instrument 20 via the bus. In this example, the control module 21 executes the control program to thereby implement various functions such as a setting processing function for performing various settings for controlling the electronic musical instrument 20.

The operation module 22 includes the keyboard 221 and the operation buttons 222. The keyboard 221 is a performance control which includes a plurality of keys (61 keys in this example) and accepts performance operation from a user. The operation buttons 222 are controls for accepting operation from a user, and accepts instruction for executing functions assigned thereto in advance (reproduction, fast-forward, rewind and the like of a musical composition set in advance) in this example. The operation module 22 outputs, to the control module 21, performance operation information indicating status of the performance operation accepted by the keyboard 221 and operation information indicating status of the operation accepted by the operation buttons 222.

The memory module 26 is a storage medium such as a hard disk or a nonvolatile memory and has an area for storing various kinds of information such as performance data in the MIDI (Musical Instrument Digital Interface) format used in the automatic performance and setting information indicating status of the settings used for control.

The communication module 27 performs wireless or wired communication with other devices according to control by the control module 21. In this example, the communication module 27 performs wireless communication with the information processing terminal 10 to transmit and receive various kinds of information.

The tone generation module 28 includes a tone generator, a DSP (Digital Signal Processor) and so on and generates audio signals according to control by the control module 21. Further, parameters relating to the audio signals that the tone generation module 28 should generate are set in the tone generation module 28 according to control by the control module 21.

The interface 29 includes terminals for connecting with external devices, such as an output terminal for supplying the audio signals generated in the tone generation module 28 to the external devices.

The position output module 24 has a configuration for enabling the information processing terminal 10 placed on the detection area DA to detect the position where it is placed. In this example, the position output module 24 includes a plurality of RFID (Radio Frequency IDentification) chips. The plurality of RFID chips are provided at a plurality of locations inside the casing 200 corresponding to the detection area DA and store identification IDs according to the positions where they are provided respectively. In this example, the detection area DA is divided into a plurality of areas, and at least one RFID chip is provided in each of the plurality of areas (hereinafter, referred to as a divided area).

Figure 3:
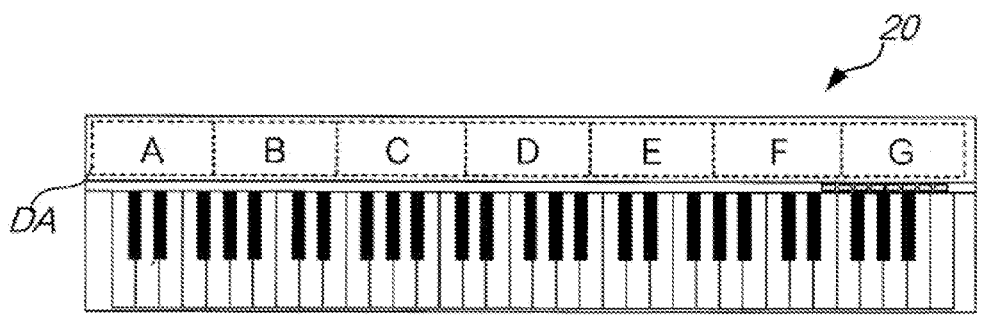
FIG. 3 is a view illustrating divided areas in the embodiment of the invention.

FIG. 3 is a view illustrating the divided areas in this embodiment of the invention. As illustrated in FIG. 3, the detection area DA is divided into seven divided areas of A, B, - - - , and G. The RFID chips in the position output module 24 are provided such that one RFID chip is provided at the center portion of each of the divided areas. The identification IDs of the RFID chips respectively indicate the divided areas in which the chips are placed, in this example.

When the information processing terminal 10 is placed on one of the divided areas, a position detection module 14 (details thereof will be described later (see FIG. 4)) included in the information processing terminal 10 reads the identification ID of the nearest RFID chip. The information processing terminal 10 can detect, through the read identification ID, the divided area where the information processing terminal 10 is placed. Note that the number of RFID chips in each divided area is not limited to one but may be plural as far as the information processing terminal 10 can recognize the divided area where it is placed through the identification ID read by the position detection module 14.

The foregoing is the description of the hardware configuration of the electronic musical instrument 20.

3. Configuration of Information Processing Terminal 10

Figures 4, 5:
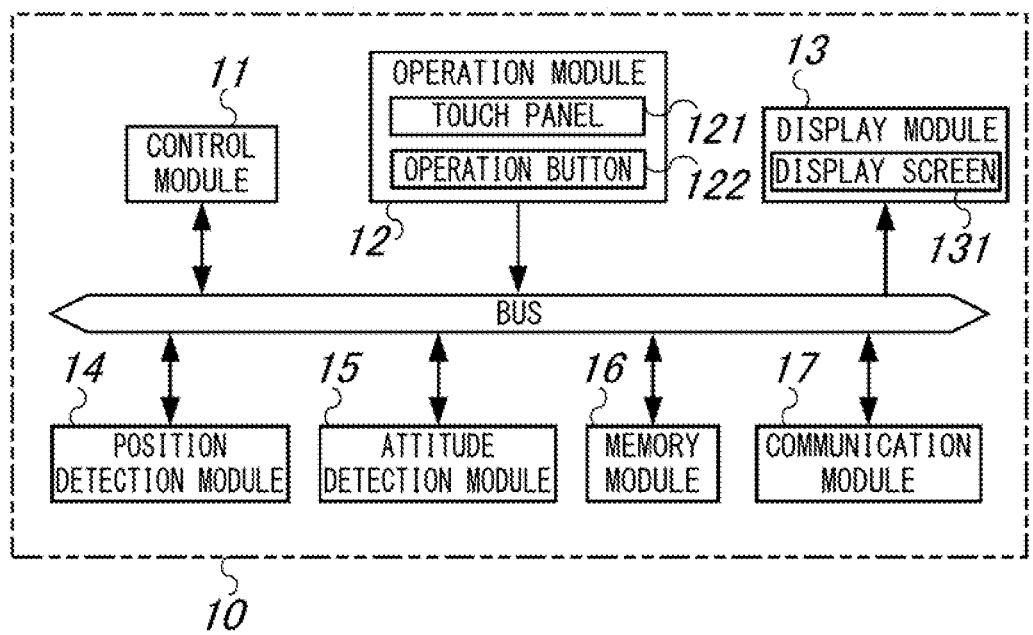
FIG. 4 is a block diagram illustrating a configuration of an information processing terminal in the embodiment of the invention.
FIG. 5 is a chart illustrating function assignment information in the embodiment of the invention.

FIG. 4 is a block diagram illustrating configuration of the information processing terminal 10 in the embodiment of the invention. The information processing terminal 10 includes a control module 11, an operation module 12, a display module 13, the position detection module 14, an attitude detection module 15, a memory module 16, and a communication module 17. Those modules are connected to one another via a bus.

The control module 11 includes a CPU, a RAM, a ROM and so on. The control module 11 executes a control program stored in the ROM or the memory module 16 to thereby control the respective modules of the information processing terminal 10 via the bus. In this example, the control module 11 executes the control program to thereby implement various functions such as a control information output function which outputs control information for controlling the electronic musical instrument 20. In this example, the various functions include functions included in a standard cellular phone, a PDA and the like, but does not necessarily need to include them.

The operation module 12 includes the touch sensor 121 and the operation button 122 for accepting operations from a user, and outputs operation information indicating status of the accepted operations to the control module 11.

The display module 13 is a display device such as a liquid crystal display and performs display according to control by the control module 11 on a display screen 131. Screen displayed on the display screen 131 when the control information output function is being implemented is a setting screen for performing various settings for controlling the electronic musical instrument 20, and the like.

The position detection module 14 detects, when the information processing terminal 10 is placed on the detection area DA in the electronic musical instrument 20, position in the detection area DA where the information processing terminal 10 is placed. In this example, the position detection module 14 is a reader for reading the RFID chip. The position detection module 14 reads the identification ID stored in the RFID chip in the position output module 24 of the electronic musical instrument 20 according to control by the control module 11, and outputs the read identification ID to the control module 11.

The attitude detection module 15 includes an acceleration sensor, an angular velocity sensor and so on, and detects the orientation of the casing 100 of the information processing terminal 10. In this example, the attitude detection module 15 detects direction of the gravitational force with respect to the casing 100 according to control by the control module 11, and outputs information indicating the result to the control module 11 to thereby enable the control module 11 to specify which portion of the casing 100 is positioned on the lower side. In the following description, when a short side portion of the casing 100 is located on the lower side, the information processing terminal 10 (the casing 100) is said to be "vertically oriented," whereas when a long side portion of the casing 100 is located on the lower side, the information processing terminal 10 (the casing 100) is said to be "horizontally oriented". For example, the information processing terminal 10 illustrated in FIG. 1B is horizontally oriented.

The memory module 16 is a storage medium such as a hard disk or a nonvolatile memory and has an area for storing function assignment information prescribing functions of the information processing terminal 10 activated according to the divided area where the information processing terminal 10 is placed, application programs for implementing the functions, and other various kinds of information and data used in the application programs.

FIG. 5 is a chart illustrating the function assignment information in the embodiment of the invention. The function assignment information is information prescribing correspondence between the divided areas A, B, - - - , and G in the detection area DA and the "functions to be activated". The "function to be activated" is a function to be activated by the application program executed in the information processing terminal 10 corresponding to the position of the divided area when the information processing terminal 10 is placed in the divided area. For example, when the information processing terminal 10 is placed in the divided area A, the application program implementing the function of "tone selection" is executed by the control module 11 to activate the function of "tone selection".

The function implemented by this application program is configured such that the processing is switched based on the attitude of the information processing terminal 10. In this example, the function to be implemented is switched between the processing relating to the control of the electronic musical instrument 20 when the information processing terminal 10 is horizontally oriented and the processing of communicating with an external device such as a not-illustrated server device and acquiring the information on its function when the information processing terminal 10 is vertically oriented. The server device stores information on the control of the electronic musical instrument 20. The respective functions will be briefly described below.

"Tone selection" is a function for selecting and deciding a tone of an audio signal generated when a key is operated in the electronic musical instrument 20 from among a plurality of tones which are a plurality of candidates. "Tone edition" is a function for editing characteristic parameters prescribing the tones which are the candidates and deciding a characteristic parameter of a tone becoming a new candidate. "Composition selection" is a function for selecting and deciding a musical composition subjected to automatic performance in the electronic musical instrument 20 from among a plurality of musical compositions which are candidates. "Rhythm style selection" is a function for selecting and deciding a rhythm that is accompaniment when a user of the electronic musical instrument 20 gives a performance from among a plurality of rhythms (Rock, Jazz and so on) which are candidates. "Key assign" is a function for dividing the keyboard 221 in the electronic musical instrument 20 into a plurality of areas and assigning tones to the respective areas. In other words, the "key assign" is a function for enabling that when a key in a specific area is operated for performance, an audio signal of the tone assigned to the specific area is generated. "Metronome" is a function for prescribing tempo of progression when the automatic performance is executed in the electronic musical instrument 20. "Recording" is a function for instructing start, stop and the like of processing of recording the performance operation performed by a user on the keyboard 221, in the memory module 26 as performance data.

Returning to FIG. 4, the description thereof is continued. The communication module 17 performs wireless or wired communication with other devices according to control by the control module 11. In this example, the communication module 17 performs wireless communication with the electronic musical instrument 20 to transmit and receive various kinds of information via the communication module 27.

The foregoing is the description of the hardware configuration of the information processing terminal 10.

4. Functional Configuration

Next, the control information output function implemented by the control program executed by the control module 11 of the information processing terminal 10 and the setting processing function implemented by the control program executed by the control module 21 of the electronic musical instrument 20 will be described. Note that a part or all of components in a control information output module 110 implementing the control information output function described below may be implemented by hardware. Further, a part or all of components in a setting processing module 210 implementing the setting processing function described below may be implemented by hardware.

Figure 6:
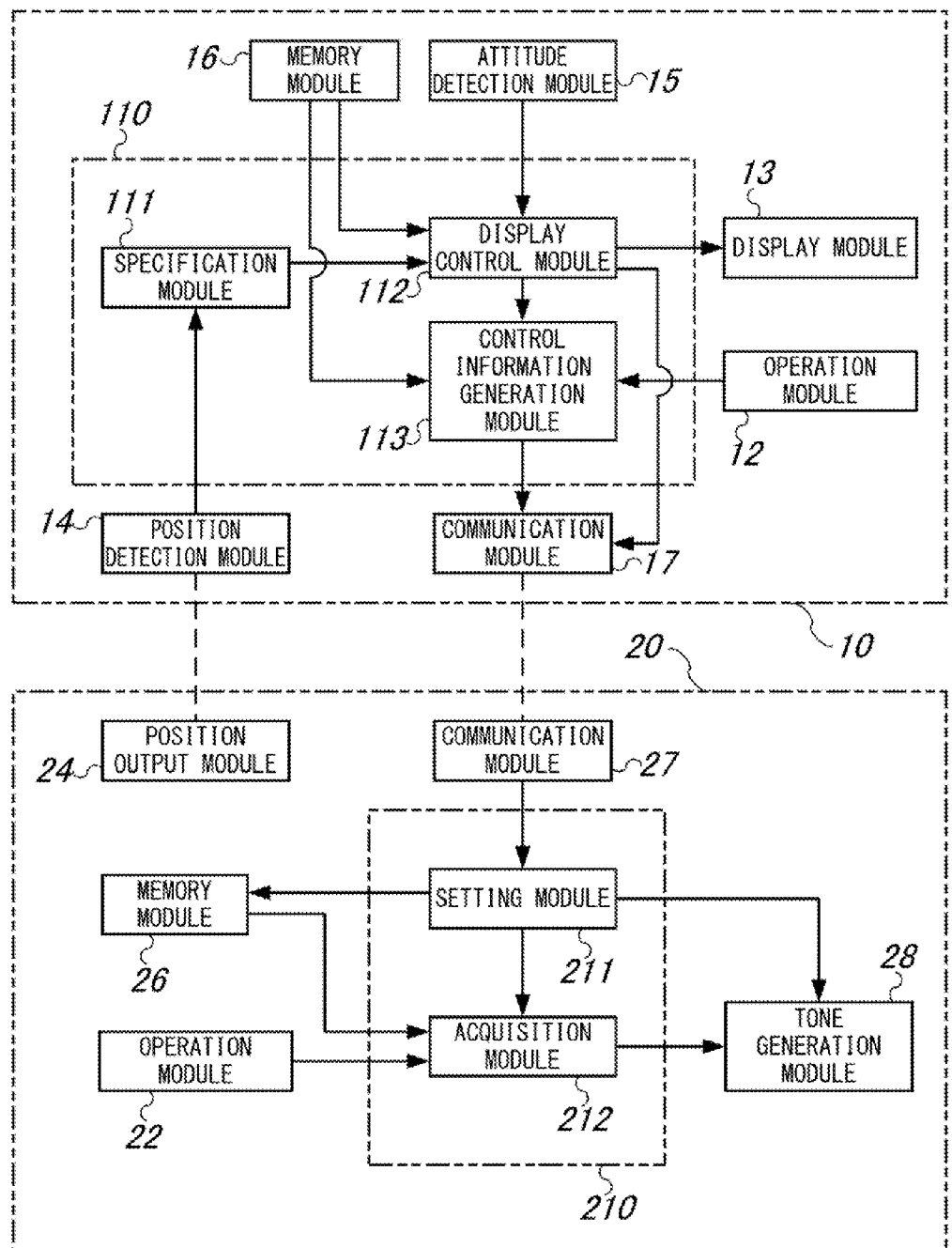
FIG. 6 is a functional block diagram illustrating configurations of control information output function of the information processing terminal and setting processing function of the electronic musical instrument in the embodiment of the invention.

FIG. 6 is a functional block diagram illustrating configurations of the control information output function of the information processing terminal 10 and the setting processing function of the electronic musical instrument 20 in the embodiment of the invention.

5. Control Information Output Function

The control information output module 110 includes a specification module 111, a display control module 112, and a control information generation module 113.

The specification module 111 acquires the identification ID outputted from the position detection module 14 and specifies the positional relation between the electronic musical instrument 20 and the information processing terminal 10. In this example, the specification module 111 specifies the divided area of the detection area DA where the information processing terminal 10 is positioned. For example, when the identification ID outputted from the position detection module 14 indicates the divided area A, the specification module 111 specifies the positional relation that the information processing terminal 10 is placed on the divided area A in the electronic musical instrument 20. The specification module 111 outputs information indicating the specified positional relation, namely, the positional information indicating the divided area where the information processing terminal 10 is placed in this example, to the display control module 112.

The display control module 112 acquires the positional information outputted from the specification module 111. The display control module 112 executes an appropriate application program to activate the function to be activated corresponding to the divided area indicated by the acquired positional information referring to the function assignment information (see FIG. 5) stored in the memory module 16. The display control module 112 controls the display module 13 according to the function implemented by the executed application program to enable the display module 13 to display the screen relating to settings for controlling the electronic musical instrument 20 on the display screen 131. In this event, the display control module 112 acquires the information outputted from the attitude detection module 15 to recognize the orientation of the information processing terminal 10 and switches the processing as describe above.

For example, when the information processing terminal 10 is placed on the divided area A and thus the function of "tone selection" is activated, the display of the display screen 131 are the display for selecting a tone to be outputted in the electronic musical instrument 20 when the information processing terminal 10 is horizontally oriented, and are the display for acquiring (downloading) from the server device the parameter and the like for implementing a new tone when the information processing terminal 10 is vertically oriented. When communicating with the server device as described above, the display control module 112 instructs the communication module 17 to function as an external device communication device for communicating with the external device such as the server device and changes the display status of the display screen 131 according to the data obtained through the communication.

Further, the display control module 112 outputs information corresponding to the display status of the display screen 131 to the control information generation module 113. This information contains information indicating the relation between a display position of an icon and the like and processing to be executed when an operation is performed at a position of the touch sensor 121 corresponding to the display position.

The control information generation module 113 acquires the information outputted from the display control module 112 and the operation information outputted from the operation module 12, and generates control information according to these pieces of information.

For example, a case in which the display for selecting a tone is performed on the display screen 131 as in the above-described example when the information processing terminal 10 is horizontally oriented is assumed here. In this state, when a user performs an operation, on the touch sensor 121, to the position of the icon corresponding to the instruction to select and decide a tone (for example, piano), the control information generation module 113 generates control information indicating the change into the tone of piano. The control information generation module 113 then outputs the generated control information to the communication module 17 and instructs the communication module 17 to transmit the control information to the electronic musical instrument 20. In this case, the communication module 17 functions as a control information communication device.

Next, a case in which the display for downloading the tone parameter and the like from the server device is performed on the display screen 131 as in the above-described example when the information processing terminal 10 is vertically oriented is assumed here. In this state, when a user performs an operation, on the touch sensor 121, to the position of the icon corresponding to the instruction to download a tone parameter, the control information generation module 113 controls the communication module 17 to acquire the designated tone parameter from the server device. The control information generation module 113 generates control information for controlling the electronic musical instrument 20 to use the acquired tone parameter. The control information generation module 113 then outputs the generated control information to the communication module 17 and instructs the communication module 17 to transmit the control information together with the tone parameter to the electronic musical instrument 20. The tone parameter is transmitted as an example of the information acquired from the server device in this example, and other information may be transmitted.

The foregoing is the description of the control information output function.

6. Setting Processing Function

The setting processing module 210 includes a setting module 211 and an acquisition module 212.

The setting module 211 acquires various kinds of information such as the control information transmitted from the information processing terminal 10 via the communication module 27 and the information acquired from the server device. The communication module 27 in this case functions as a control information receiving device. The setting module 211 makes various settings such as the setting relating to the sound generation in the electronic musical instrument 20 according to the acquired control information. For example, when the setting module 211 acquires the control information indicating the change into the tone of piano, the setting module 211 changes the setting in the tone generation module 28 to the setting of generating audio signals in the tone of piano in response to the performance operation on the keyboard 221.

Further, when the setting module 211 acquires the tone parameter and the control information controlling the electronic musical instrument 20 to use the tone parameter, the setting module 211 performs setting such that the tone generation module 28 can generate audio signals in a tone using the tone parameter. Note that the setting module 211 performs various settings such as a setting and an addition of a musical component to be subjected to automatic performance and a setting of reproduction speed of the automatic performance, according to the control information generated by the above-described functions to be activated. For example, for adding a musical component to be subjected to automatic performance, the setting module 211 stores the performance data corresponding to the musical component into the memory module 26. For setting a musical component to be subjected to automatic performance and for setting the reproduction speed, the setting module 211 performs setting of musical composition data to be read from the memory module 26 and reproduced and setting of its reproduction speed, to the acquisition module 212, respectively.

The acquisition module 212 acquires instruction information indicating an instruction to generate sound, and outputs it to the tone generation module 28. The acquisition module 212 specifies the note number and the like based on the performance operation information outputted from the operation module 22, and acquires the performance operation information as the instruction information instructing sound generation in the note number. The acquisition module 212 further reads musical composition data from the memory module 26 according to the setting by the setting module 211 and a reproduction instruction from the user through the operation button 222 or the like, and acquires the read data as the instruction information instructing to generate sound indicated by the musical composition data.

When the instruction information acquired by the acquisition module 212 is outputted to the tone generation module 28, the tone generation module 28 functions as an audio signal generation device for generating audio signals based on the instruction information and the settings performed by the setting module 211.

The foregoing is the description of the setting processing function.

7. Display Examples of Display Screen 131

Figure 7A:
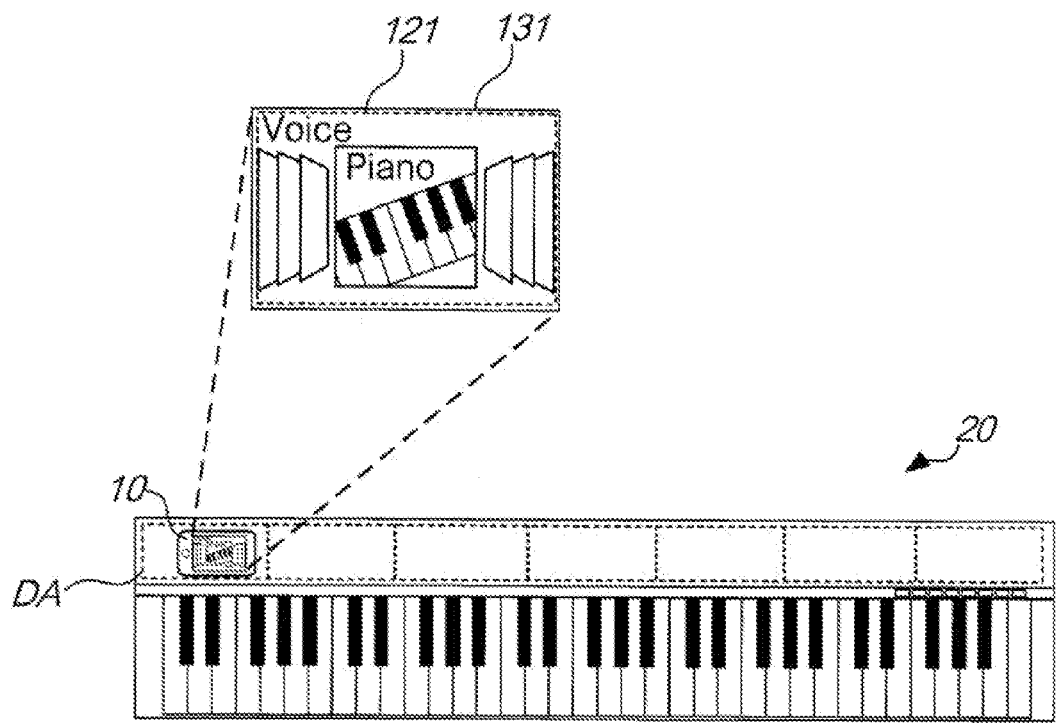
FIGS. 7A and 7B are views illustrating examples of display status in the information processing terminal in the embodiment of the invention.
Figure 7B:
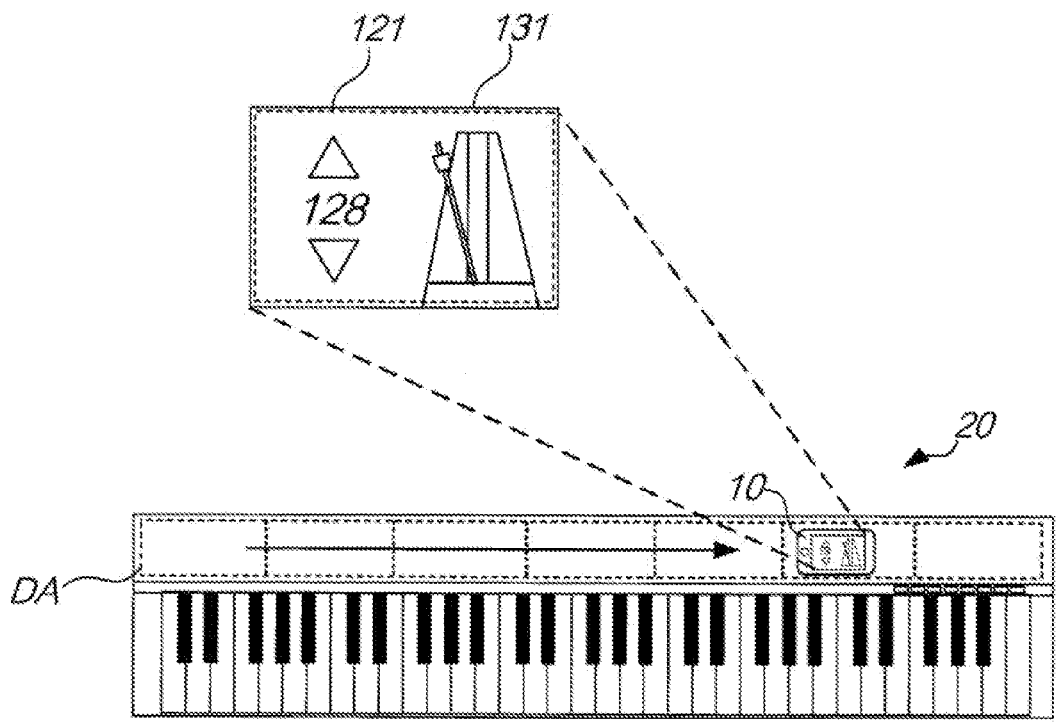
Figure 8:
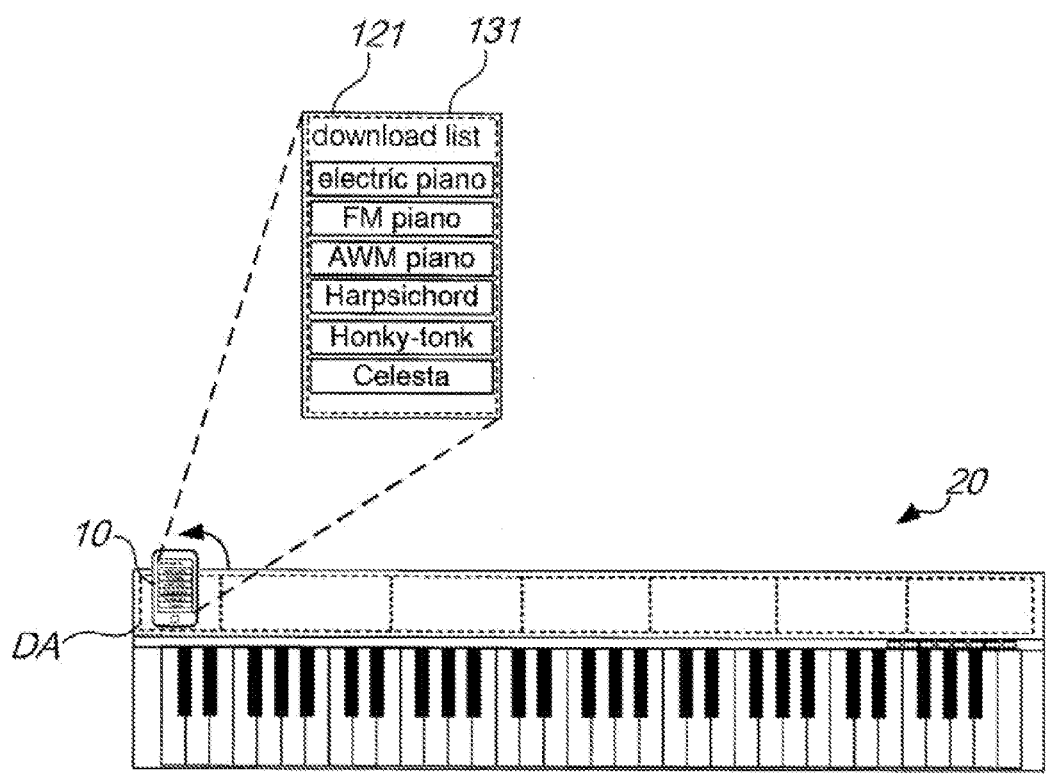
FIG. 8 is a view illustrating an example of display status when an orientation of the information processing terminal is changed in the embodiment of the invention.

Next, display examples of the display screen 131 when the information processing terminal 10 is placed in one of the divided areas of the detection area DA will be descried using FIGS. 7A, 7B and 8.

FIGS. 7A and 7B are views illustrating examples of the display status in the information processing terminal 10 in the embodiment of the invention. As illustrated in FIG. 7A, when the information processing terminal 10 is placed to be horizontally oriented at a position corresponding to the divided area A (see FIG. 3) of the detection area DA of the electronic musical instrument 20, the information processing terminal 10 displays the screen relating to the function of "tone selection" (the screen for selecting a tone) on the display screen 131. The user can switch and decide the tone by performing an operation on the touch sensor 121 while this display is performed.

As illustrated in FIG. 7B, when the information processing terminal 10 is moved to the divided area F by the user, the information processing terminal 10 displays the screen relating to the function of "metronome" (the screen for changing the reproduction speed of automatic performance) on the display screen 131. The information processing terminal 10 may be configured to, in this event, display the screens relating to the respective functions corresponding to the divided areas B, C, D and E, or keep the display of the screen before movement, or display other screen (such as "moving") during passage through the divided areas B, C, D and E on the movement path.

When the user performs an operation on the touch sensor 121 while the information processing terminal 10 is placed in the divided area F, the screen indicating the tempo of a musical component is displayed on the display screen 131, and the user can change the reproduction speed of the musical component in automatic performance.

FIG. 8 is a view illustrating an example of display status when the orientation of the information processing terminal 10 is changed in the embodiment of the invention.

The example in FIG. 8 illustrates the case where the information processing terminal 10 placed on the divided area A (FIG. 7A) is changed in orientation to be vertically oriented. In this case, the screen displayed on the display screen 131 is changed from the one for selecting a tone to the one for acquiring the tone from the server device. By performing an operation on the touch sensor 121 while this screen is displayed, the user can instruct the information processing terminal 10 to download parameters of the tone from the server device, to add the tone into the list of the candidates of tones, to transmit the downloaded parameters of the tones to the electronic musical instrument 20, and to control the electronic musical instrument 20 to use the tone as a tone of the audio signals to be generated by the tone generation module 28.

As described above, with the sound generating system 1 in the embodiment of the invention, the user can perform setting for controlling the electronic musical instrument 20 by placing the information processing terminal 10 at a position in the detection area DA in the electronic musical instrument 20. In this event, the user can change setting items which can be set using the information processing terminal 10 by moving its position. Accordingly, even if many operation buttons 222 are not provided on the electronic musical instrument 20 and the size of the display screen 131 of the information processing terminal 10 is not so large, the user can intuitively perform setting for controlling the electronic musical instrument 20 by moving the information processing terminal 10 with respect to the electronic musical instrument 20.

MODIFICATION EXAMPLES

The embodiment of the invention has been described above, but the invention can be carried out in various forms as described below.

Modification Example 1

Though the user selects the function for performing setting in the electronic musical instrument 20 by moving the information processing terminal 10 with respect to the electronic musical instrument 20 in the above-described embodiment, the selection may be performed in a hierarchical manner. For example, for activating a specific function, the user moves the information processing terminal 10 to a specific divided area to thereby select, as a first hierarchy, one category from a plurality of categories. The user then performs a previously determined operation on the operation module 12 to determine one category, and further moves the information processing terminal 10 to a specific divided area to thereby select a specific function from among a plurality of functions to be activated set as a second category in the determined category. To implement such a configuration, it is only necessary to form the function assignment information in a hierarchical configuration.

FIG. 9 is a chart illustrating the function assignment information in the modification example 1 of the invention. In the function assignment information in this example, the correspondence between the divided area and the category is prescribed as the first hierarchy and the correspondence between the divided area and the function to be activated belonging to each category is prescribed as the second hierarchy.

The display control module 112 first specifies the category corresponding to the divided area indicated by the positional information outputted from the specification module 111 referring to the function assignment information prescribed as described above, and then instructs the display module 13 to display the screen corresponding to the specified category on the display screen 131. In this state, upon detecting a previously determined operation (an operation of touching a specific position of the touch sensor 121 or the like) referring to the operation information outputted from the operation module 12, the display control module 112 shifts to the processing of selecting the function to be activated belonging to the specified category. In other words, the display control module 112 selects the function to be activated corresponding to the divided area indicated by the positional information from among the functions to be activated belonging to the previously specified category, and executes an appropriate application program to activate the selected function.

For example, when the user wants to use the function of "musical component selection," the user first moves the information processing terminal 10 to the divided area B. In this state, the display of the screen indicating that the category is in a "musical component selection mode" is performed on display screen 131. When the user performs a previously determined operation such as touching a specific position of the touch sensor 121, the screen relating to the function of "score display" belonging to the category of "musical component selection mode" and corresponding to the divided area B are displayed on the display screen 131 of the information processing terminal 10 located in the divided region B. Further, by moving the information processing terminal 10 to the divided area A, the user can control the information processing terminal 10 to display the screen relating to the function of "musical component selection" on the display screen 131. The display in this state is similar to that in the above-described embodiment.

When the user performs a specific operation, the display control module 112 performs the processing to shift back to the mode of performing selection in the first hierarchy, that is, selection of another category.

Note that the function assignment information is described for two hierarchies in the above-described configuration, but the function assignment information may be composed of more hierarchies.

Modification Example 2

In the above-described embodiment, the screen displayed on the display screen 131 may be changed when generation of an audio signal is started in the tone generation module 28. The start of the generation of the audio signal means that the acquisition module 212 acquires the instruction information and starts to output the instruction information to the tone generation module 28. This is the case when automatic performance is started, the case when performance operation by a user is continuously performed, or the like. The configuration of the control information output function in this case will be described using FIG. 10.

FIG. 10 is a functional block diagram illustrating a configuration of the control information output function in a modification example 2 of the invention.

A control information output module 110A implementing the control information output function in this example includes a specification module 111, a display control module 112A, a control information generation module 113, and a generation start detection module 114. The specification module 111 and the control information generation module 113 are the same as those in the above-described embodiment, and therefore description thereof will be omitted.

The generation start detection module 114 is a detection device for detecting start and finish of the generation of audio signal in the tone generation module 28 of the electronic musical instrument 20. In this example, when the generation of audio signal is started in the tone generation module 28, the electronic musical instrument 20 outputs start information indicating start of the generation from the communication module 27. Further, when the generation of audio signal is stopped in a fixed period, the electronic musical instrument 20 regards the stop as finish of the generation and outputs finish information indicating the finish of the generation.

The generation start detection module 114 acquires the start information and the finish information via the communication module 17 and thereby detects the start and the finish of the generation of audio signal. Upon detecting the start of the generation of audio signal, the generation start detection module 114 outputs start detection information to the display control module 112A. Further, upon detecting the finish of the generation of audio signals, the generation start detection module 114 outputs finish detection information to the display control module 112A.

The display control module 112A controls the display module 13 to change the screen displayed on the display screen 131 during the period from acquisition, from the generation start detection module 114, of the start detection information to acquisition of the finish detection information. The screen after the change may be the score or lyrics of the musical component under automatic performance, a predetermined photograph, or the like.

Though an example in which setting of the tone color or the like is performed before performance has been described in the above-described embodiment, the display control module 112A may control the display module 13 to display a performance control, tone edit control for changing a parameter such as the tone, pitch bend controller, and the like on the display screen 131 during the performance. In this case, the information indicating operation on the touch sensor 121 by a user may be included in the control information and transmitted to the electronic musical instrument 20 so that the tone generation module 28 can generate the audio signal corresponding to the operation on the touch sensor 121 in real time.

Note that the screen displayed on the display screen 131 is changed at the time when the generation of audio signal is started in the tone generation module 28 in the above description, but the screen may be changed at the time when the setting by the setting module 211 is completed. In this case, it is only necessary that completion information indicating that the setting by the setting module 211 has been completed, in place of the start information, is outputted from the communication module 27. If the position detection module 14 and the attitude detection module 15 detect the movement of the information processing terminal 10, the screen displayed on the display screen 131 may be returned to the state before the change.

Modification Example 3

In the above-described embodiment, when the information processing terminal 10 is placed in the divided area G to record the performance operation by the function of "recording", the instruction information acquired by the acquisition module 212 of the electronic musical instrument 20 may be recorded in the information processing terminal 10. The configuration of the control information output function in this case will be described using FIG. 11.

Figure 11:
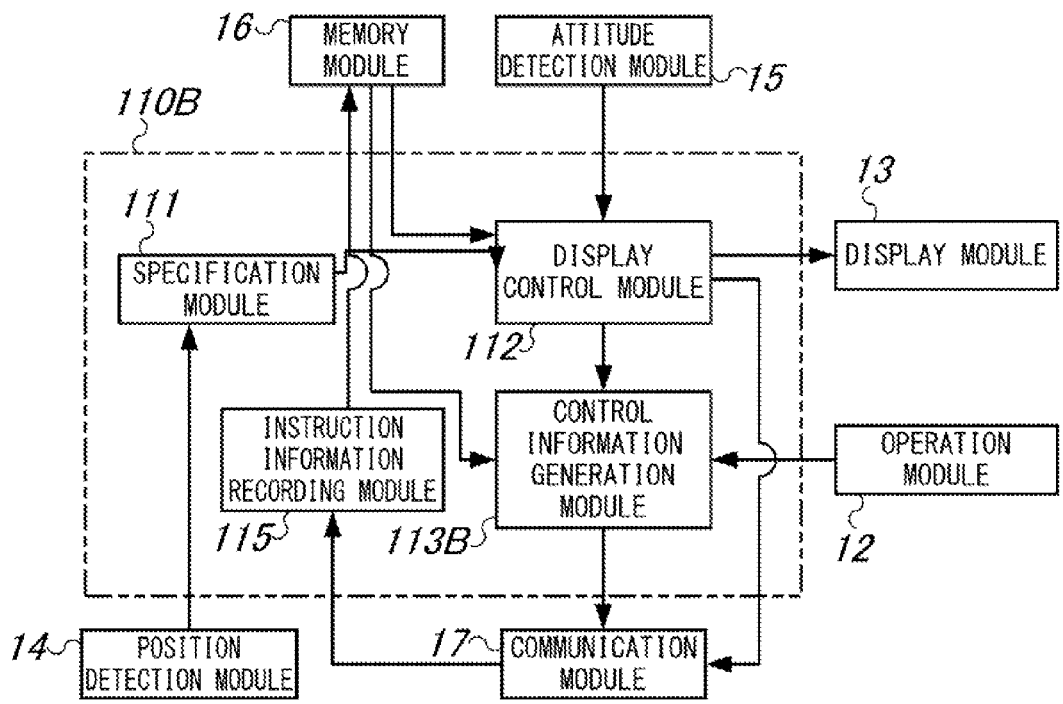
FIG. 11 is a functional block diagram illustrating a configuration of control information output function in a modification example 3 of the invention.

FIG. 11 is a functional block diagram illustrating a configuration of the control information output function in a modification example 3 of the invention.

A control information output module 110B implementing the control information output function in this example includes a specification module 111, a display control module 112, a control information generation module 113B, and an instruction information recording module 115. The specification module 111 and the display control module 112 are the same as those in the above-described embodiment, and therefore description thereof will be omitted.

Upon receiving an instruction to start recording of performance operation or upon receiving an instruction to finish the recording while the function of "recording" is implemented, the control information generation module 113B outputs control information indicating the respective instructions Upon acquiring the control information, the control module 21 of the electronic musical instrument 20 transmits the instruction information acquired by the acquisition module 212 to the information processing terminal 10 via the communication module 27 with the acquisition time series maintained in the period from the instruction to start the recording to the instruction to finish the recording. In this event, the communication module 27 functions as an instruction information transmission device.

Upon acquiring the instruction information from the electronic musical instrument 20 via the communication module 17, the instruction information recording module 115 records the instruction information in time series in the memory module 16. In this event, the communication module 17 functions as an instruction information reception device. The instruction information recorded as described above may be transmitted from the information processing terminal 10 to the electronic musical instrument 20 and used in the tone generation module 28 for the generation of audio signal.

Modification Example 4

In the above-described embodiment, the various settings set in the electronic musical instrument 20 may be recorded in the information processing terminal 10. The configuration of the control information output function in this case will be described using FIG. 12.

Figure 12:
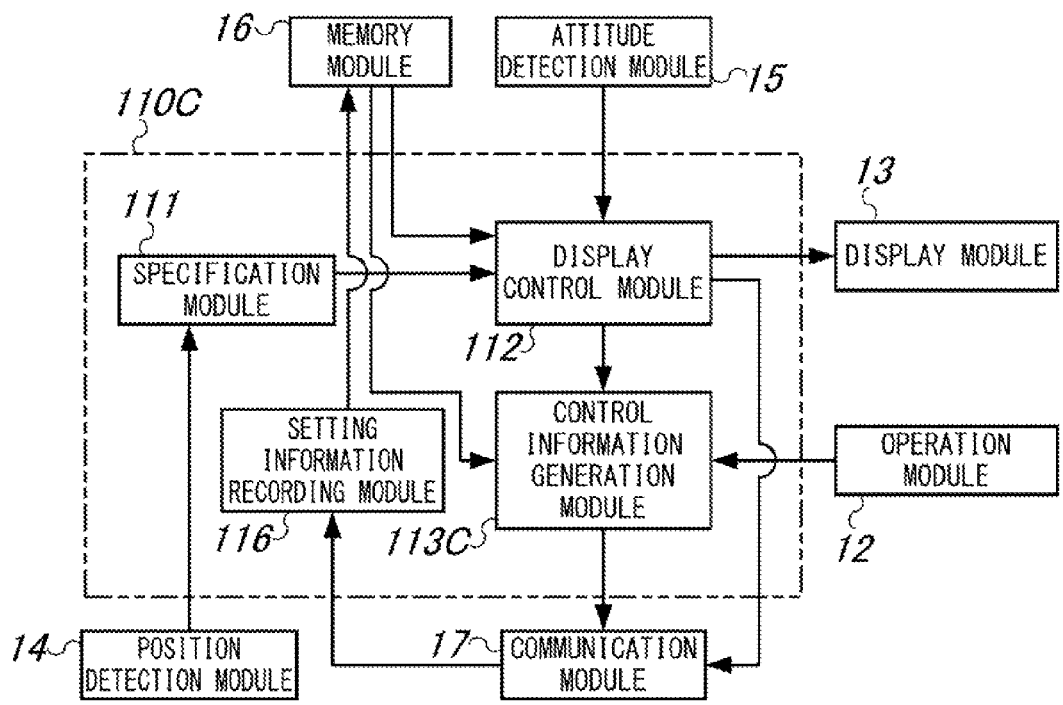
FIG. 12 is a functional block diagram illustrating a configuration of control information output function in a modification example 4 of the invention.

FIG. 12 is a functional block diagram illustrating the configuration of the control information output function in a modification example 4 of the invention.

A control information output module 110C implementing the control information output function in this example includes a specification module 111, a display control module 112, a control information generation module 113C, and a setting information recording module 116. The specification module 111 and the display control module 112 are the same as those in the above-described embodiment, and therefore description thereof will be omitted.

Upon receiving an instruction to record settings of the electronic musical instrument 20 by an operation on the operation module 12, the control information generation module 113C outputs control information requesting transmission of the settings. Upon acquiring the control information, the control module 21 of the electronic musical instrument 20 transmits the setting information indicating the settings presently set by the setting module 211 to the information processing terminal 10 via the communication module 27. In this event, the communication module 27 functions as a setting information transmission device.

Upon acquiring the setting information from the electronic musical instrument 20 via the communication module 17, the setting information recording module 116 records the setting information in the memory module 16. In this event, the communication module 17 functions as a setting information reception device.

Upon receiving an instruction to make collective settings in the electronic musical instrument 20 by an operation on the operation module 12, the control information generation module 113C outputs control information indicating that the setting information stored in the memory module 16 are to be set in the electronic musical instrument 20.

Modification Example 5

The processing is switched according to the orientation of the information processing terminal 10 using the attitude detection module 15 in the above-described embodiment, but it is not necessary to switch the processing. If the processing is not switched, the attitude detection module 15 is not necessary.

Modification Example 6

The specification module 111 specifies the positional relation between the information processing terminal 10 and the electronic musical instrument 20 by the combination of the RFID chips in the position output module 24 and the reader of the RFID chip in the position detection module 14 in the above-described embodiment, but the positional relation may be specified using another method.

Examples of the method include: combination of magnetic tapes (the position output module 24) on which information indicating positions of the divided areas are recorded and a reading module (the position detection module 14) reading the information on the magnetic tapes; combination of images (the position output module 24) in which information indicating positions of the divided areas are recorded and a camera (the position detection module 14) capturing the image; combination of light emitting modules (the position output module 24) such as LEDs (Light Emitting Diode) emitting infrared light, visible light or the like in a light emission patterns indicating positions of the divided areas and a light sensor (possibly, a camera) (the position detection module 14) detecting the light emission; combination of speakers (the position output module 24) generating ultrasonic waves or sounds in a sound emission patterns indicating positions of the divided areas and a microphone (the position detection module 14) collecting the ultrasonic waves or sounds; and combination of antennas (the position output module 24) generating radio waves in patterns indicating positions of the divided areas and an antenna (the position detection module 14) collecting the radio waves.

Further, a configuration corresponding to the position detection module 14 may exist in the electronic musical instrument 20, and a configuration corresponding to the position output module 24 may exist in the information processing terminal 10. For example, it is conceivable to combine a light sensor provided in each of the divided areas of the electronic musical instrument 20 and a light emission module provided in the information processing terminal 10. In this case, the electronic musical instrument 20 specifies a light sensor which detects the light emission from the light emission module and transmits information indicating the divided area where the specified light sensor is provided to the information processing terminal 10 to thereby enable the specification module 111 to specify the positional relation.

The electronic musical instrument 20 may be configured to include, in each divided area, a weight sensor detecting weight of a substance placed on the divided area to thereby detect the fact that the substance has been placed therein. In this case, the electronic musical instrument 20 transmits the information indicating the divided area where the weight sensor detected that the substance has been placed, to the information processing terminal 10 to thereby enable the specification module 111 to specify the positional relation. In this case, a configuration corresponding to the position output module 24 is unnecessary in the information processing terminal 10.

Though the positional relation can be specified when the information processing terminal 10 is placed on the detection area DA according to the above-described method, it is also adoptable that the positional relation is specified also in the case other than that the information processing terminal 10 is placed on the detection area DA and the functions to be activated vary according to the positional relation. The positional relation can be specified using a publicly known technique such as triangulation.

Further, the specification module 111 may be configured to specify the positional relation by a configuration without the positional output module 24. For example, in a state where the information processing terminal 10 is placed at a previously determined position (the divided area A or the like) in the detection area DA, a user operates the operation module 12 and sets the position as the initial position. The position detection module 14 then detects that the information processing terminal 10 has been moved through the sensor detecting movement such as an acceleration sensor, and the specification module 111 calculates how far the information processing terminal 10 has been moved from the initial position from the detection result to specify the positional relation. In this case, the position of the information processing terminal 10 is specified by the specification module 111 as a relative positional relation from the initial position, but it is effective in such a configuration that the electronic musical instrument 20 is not moved after the initial position is set.

Modification Example 7

Though the detection area DA is located at the inclined position of the casing 200 so that when the information processing terminal 10 is rotated, the change in orientation can be recognized by the information processing terminal 10 in the above-described embodiment, the information processing terminal 10 may recognize the change in orientation when it is rotated by another method.

For example, in the case of the method of specifying the positional relation using the image among the methods described in the modification example 6, the information processing terminal 10 can recognize its orientation by configuring the camera to capture different images between the case where the information processing terminal 10 is vertically oriented and the case where it is horizontally orientated.

Modification Example 8

In the above-described embodiment, the information processing terminal 10 may acquire individual identification information such as ID, kind and so on of the electronic musical instrument 20 and change the function assignment information used in the control (the control information output function) by the control module 11 according to the acquired individual identification information. In this case, the information processing terminal 10 may acquire the individual identification information via the communication modules 17, 27 or may acquire the individual identification information by the position detection module 14 while incorporating the individual identification information into the identification ID of the RFID chip in the position output module 24. In addition, the memory module 16 only needs to store a plurality of pieces of function assignment information and associate those pieces of function assignment information with the respective individual identification information.

Modification Example 9

The setting for controlling the electronic musical instrument 20 in the information processing terminal 10 is performed through the operation by the user on the touch sensor 121 in the above-described embodiment, but the operation may be performed by an operation on a physical control such as the operation button 122.

Modification Example 10

Though the size of the divided areas are larger than the casing 100 of the information processing terminal 10 in the above-described embodiment, the detection area DA may be composed of much more divided areas each having a smaller size. In other words, the positional relation is specified not based on which divided area the information processing terminal 10 is included in, but based on which divided area the information processing terminal 10 is in correspondence with.

Modification Example 11

The movement of the information processing terminal 10 with respect to the electronic musical instrument 20 is used for selection of the function to be activated for performing setting in the electronic musical instrument 20, and the setting operation such as the selection of each parameter in the activated function is performed by the operation on the touch sensor 121 in the above-described embodiment. However, also the setting operation may be performed by the movement of the information processing terminal 10. In this case, it is conceivable that when a previously determined operation is performed on the operation module 12 after selection of the function to be activated, the information processing terminal 10 recognizes movement of the information processing terminal 10 itself after the previously determined operation as the setting operation.

For example, in the state illustrated in FIG. 7A, the user can change kind of the tone to be selected by performing a predetermined operation (the operation of touching a specific position of the touch sensor 121 or the like) and then moving the information processing terminal 10 to right and left.

Modification Example 12

Though the application program is provided for each of the functions to be activated and one of the application programs is executed according to the position in the detection area DA of the information processing terminal 10 in the above-described embodiment, it is also conceivable that the application programs is integrated into one application program and the processing to be used is switched based on which function is to be activated. Further, the application programs may be integrated with the control program or the like.

Modification Example 13

The electronic musical instrument 20 is a keyboard instrument such as an electric piano in the above-described embodiment, but the electronic musical instrument 20 may be a different instrument such as an electronic guitar as long as it has a configuration corresponding to the tone generation module 28 such as an electronic tone generator. Further, the invention is not limited to the electronic musical instrument 20 having the performance control such as the keyboard 221 but may be a sound generator which does not have such a performance control.

Further, the invention may be an electronic device other than the above-described sound generators. Examples of the electronic device include home electric appliances such as a refrigerator, a microwave oven, an air conditioner and the like, audio apparatuses such as an optical disk player, a television set, a mini-component stereo, an AV amplifier and the like, and a device of turning on/off illumination. As described above, the electronic device of the invention may be any device as long as it performs some processing according to settings.

Modification Example 14

The transmission of the control information from the information processing terminal 10 to the electronic musical instrument 20 is performed via the communication modules 17 and 27 in the above-described embodiment, but the transmission may be performed via the antenna in the reader of the position detection module 14 and the antenna in the RFID chip of the position output module 24.

Modification Example 15

The control programs and the application programs in the above-described embodiment can be provided in the state that they are recorded on a computer-readable recording medium such as a magnetic recording medium (magnetic tape, magnetic disk or the like), an optical recording medium (optical disk or the like), a magneto-optical recording medium, a semiconductor memory or the like. Further, the information processing terminal 10 and the electronic musical instrument 20 may download the control programs over the network.

According to the above described embodiment and modification examples, it is possible to simplify configuration of a control panel for performing various settings while enabling intuitive settings, in an electronic device.

What is claimed is:
1. An information processing terminal which communicates with an electronic device, the electronic device including a casing having a detection area defined thereon, the information processing terminal comprising:
 a specifying device for specifying a positional relation between the electronic device and the information processing terminal, wherein the positional relation includes a position of the information processing terminal on the detection area;
 a display for displaying a screen;
 a function selector for selecting a function from among a plurality of functions of the electronic device by referring to function assignment information which denotes a correspondence between the positional relation specified by the specifying device and a function of the plurality of functions of the electronic device, wherein the function assignment information denotes a correspondence to different functions for different specified positional relations,
 a display controller for controlling the display such that the display displays an information related to the function selected by the function selector;

a control information generator for generating control information for controlling the electronic device based on an operation, by a user, on function-related information displayed on the display; and a control information transmitter for transmitting the control information generated by the control information generator to the electronic device; wherein the electronic device is an electronic musical instrument.

2. The information processing terminal according to claim 1, further comprising:

an attitude detector for detecting attitude of the information processing terminal; and a communication device for communicating, when the attitude detected by the attitude detector satisfies a first condition, with an external device which stores an information regarding control of the electronic device, wherein the display controller controls the display such that, when the communication device performs the communication, the display displays an information based on the communication performed by the communication device, and the control information generator generates the control information when the attitude detected by the attitude detector satisfies a second condition.

3. The information processing terminal according to claim 1, wherein the specifying device specifies the positional relation by detecting one of a plurality of positional information outputted by the electronic device.

4. The information processing terminal according to claim 1, wherein the function to be selected based on the positional relation is defined by a plurality of positional relations in a plurality of levels of hierarchy.

5. A sound generating system comprising the information processing terminal according to claim 1 and the electronic device, wherein the electronic device comprises:

a control information receiver for receiving the control information transmitted from the information processing terminal;

a setting device for performing a setting regarding sound generation based on the control information received by the control information receiver;

an acquiring device for acquiring an instruction information indicating instruction of sound generation; and an audio signal generator for generating an audio signal based on the setting performed by the setting device and the instruction information acquired by the acquiring device.

6. The sound generating system according to claim 5, wherein the information processing terminal further comprises a generation start detector for detecting start of generation of the audio signal by the audio signal generator, and the display controller controls the display such that the information displayed on the display is changed when the generation start detector detects the start of generation of the audio signal.

7. The sound generating system according to claim 5, wherein the electronic device further comprises a setting information transmitter for transmitting setting information indicating present status of the setting performed by the setting device to the information processing terminal, the information processing terminal further comprises:

a setting information receiver for receiving the setting information transmitted from the electronic device; and a setting information storing device for storing the setting information received by the setting information receiver, and the control information generator generates control information to instruct the setting device of the electronic device to perform the setting based on the setting information stored by the setting information storing device.

8. A system comprising the information processing terminal according to claim 1 and the electronic device, wherein the electronic device comprises:

a control information receiver for receiving the control information transmitted from the information processing terminal;

a setting device for performing a setting based on the control information received by the control information receiver;

an acquiring device for acquiring an instruction information indicating instruction of operation of the electronic device; and a processor for executing processing based on the setting performed by the setting device and the instruction information acquired by the acquiring device.

9. The information processing terminal according to claim 1, the detection area being divided into a plurality of areas, wherein the positional relation includes information about at which of the divided areas the information processing terminal is placed.

* * * * *